United States Patent [19]
Noda et al.

[11] Patent Number: 4,993,962
[45] Date of Patent: Feb. 19, 1991

[54] CLOSED TYPE CONNECTING BLOCK

[75] Inventors: Minoru Noda; Junji Nomura; Shinji Sakamoto, all of Inazawa, Japan

[73] Assignee: Tomei Tsushin Kogyo Co., Ltd., Inazawa, Japan

[21] Appl. No.: 566,966

[22] Filed: Aug. 13, 1990

[30] Foreign Application Priority Data

Aug. 18, 1989 [JP] Japan .................................. 1-213845
Mar. 20, 1990 [JP] Japan .................................. 2-71432

[51] Int. Cl.⁵ ............................................. H01R 13/44
[52] U.S. Cl. ..................................... 439/136; 439/131
[58] Field of Search .............. 439/131, 135, 136, 142, 439/143, 144, 147, 149, 676

[56] References Cited

U.S. PATENT DOCUMENTS

| | | | |
|---|---|---|---|
| 3,622,684 | 11/1971 | Press | 439/131 |
| 4,268,100 | 5/1981 | Kekas et al. | 439/131 |
| 4,372,629 | 2/1983 | Propst et al. | 439/131 X |
| 4,857,004 | 8/1989 | Poirier | 439/136 X |

Primary Examiner—Neil Abrams
Assistant Examiner—Khiem Nguyen
Attorney, Agent, or Firm—Paul L. Sjoquist

[57] ABSTRACT

A closed type connecting block including a shutter which close and open an opening formed on a housing and which is biased toward a position to close the opening. The shutter and the housing are formed with notches which sealingly receive a core inserted into the connecting block therebetween. The connecting block also includes a pivotable jack mounted therein to enable users to easily insert and remove a plug connected to the cord from communication equipment.

15 Claims, 12 Drawing Sheets

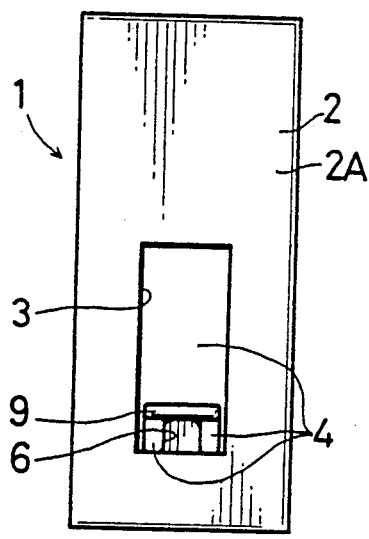
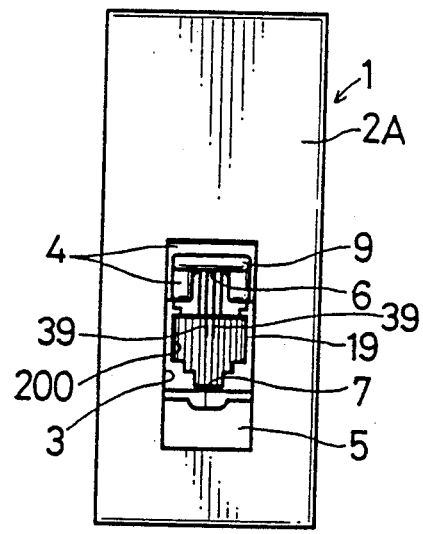
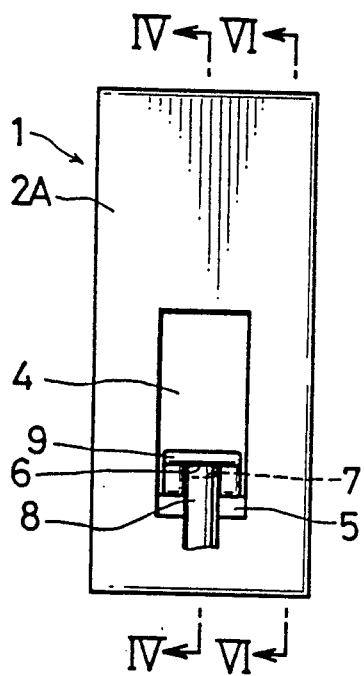
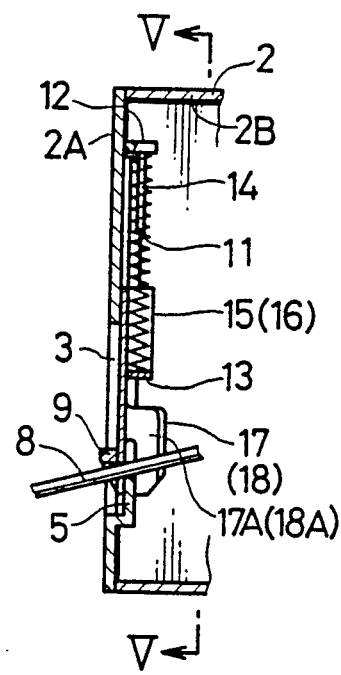
FIG. 1
FIG. 2
FIG. 3
FIG. 4

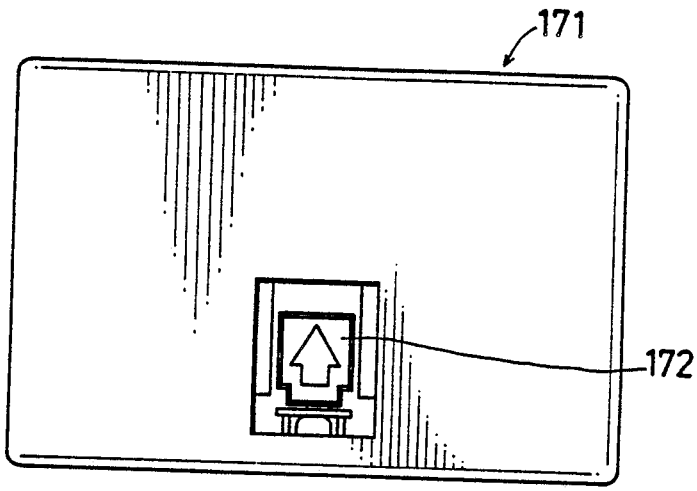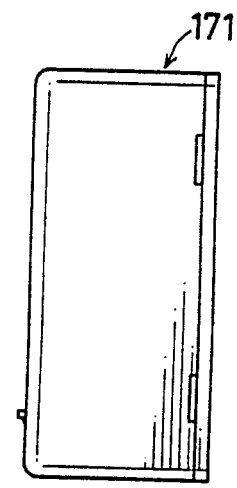
FIG. 31    FIG. 32
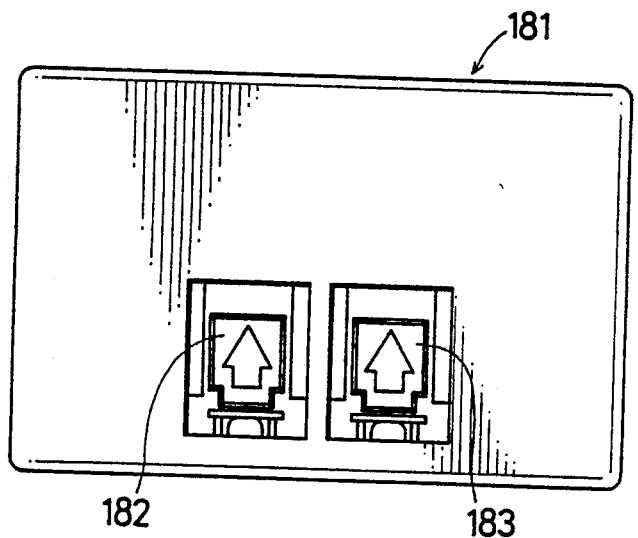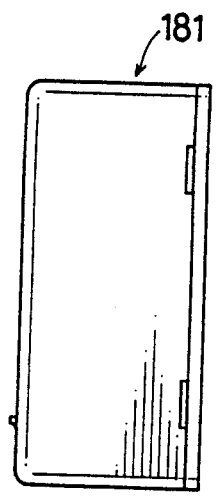
FIG. 33    FIG. 34

4,993,962

CLOSED TYPE CONNECTING BLOCK

BACKGROUND OF THE INVENTION

The present invention relates to a closed type connecting block for connecting communication equipment such as a telephone, a facsimile and the like to a communication line such as a telephone line, and more particularly, the invention relates to a closed type connecting block which can sealingly enclose a jack connected to the communication line and a plug received in the jack and connected to a cord from the communication equipment.

Some of connecting blocks are used under unfavorable circumstances, for example, in outdoor locations in which connecting blocks are directly or indirectly exposed to raindrops, in bath rooms in which connecting blocks are exposed lo high degree of humidity, in seasides in which connecting blocks are exposed to sea breeze, or in spas in which connecting blocks are exposed to corrosive gases. In those connecting blocks, contacts of the plugs and jacks are corroded or rusted to decrease insulation performance or conductivity. Therefore, the plugs and jacks have to be frequently replaced by new ones.

Japanese Laid-Open Utility Model Publication No. 60-170976 teaches a closed type connecting block for use with a telephone. The connecting block comprises a base plate, screw-fastened terminals provided on the base plate, a cover plate, a rubber packing positioned between the base plate and the cover plate, and bushings fitted in apertures for receiving cords from communication equipment. The ends of the cords from the communication equipment are secured to the terminals by screws, and the cover plate is tightly secured to the base plate by screws to form sealing engagement therebetween.

A problem usually associated with the conventional connecting block is that the screws have to be loosened to remove the cover plate and subsequently the terminals have to be unscrewed to remove the cords when the cords are required to be removed from the terminals to replace or relocate the communication equipment or to check a communication line. This may lead to increased working time.

SUMMARY OF THE INVENTION

It is an object of the invention to provide a connecting block which may reduce the working time to replace or relocate the communication equipment or to check the communication line.

It is another object of the invention to provide a connecting block which may effectively prevent entry of moisture, corrosive gases and the like thereinto.

According to the present invention, there is provided a closed type connecting block which comprises a housing including a housing body and a covering member sealingly engageable with the housing body. The covering member has an opening of a size to permit insertion of a plug connected to a cord from the communication equipment. A shutter is provided for closing and opening the opening. A jack is electrically connected to a communication line and has a plug insertion opening. The shutter and the covering member each has notch contoured to the outer configuration of the cord so that the cord is tightly secured between the notches when the shutter is shifted to a first position to close the opening under the condition that the plug is inserted into the plug insertion opening of the jack. A first resilient member is provided for biasing the shutter toward the first position to close the opening. Jack support members are provided for pivotably supporting the jack. Second resilient members are provided for biasing the jack toward the first position. First engaging members are mounted on the shutter, and second engaging members are mounted on the jack. The second engaging members are adapted to engage the first engaging members. The first engaging members are engaged with the second engaging members to pivot the jack against the biasing force of the second resilient members so that the plug insertion opening is faced to the opening in parallel relation when the shutter is shifted toward a second position to open the opening against the biasing force of the first resilient member. The jack is pivoted with the aid of the biasing force of the second resilient members so that the plug insertion opening of the jack is inclined toward the first position when the shutter is shifted toward the first position with the aid of the biasing force of the first resilient member.

The first engaging members of the shutter, when the plug is not completely inserted into the jack, may act as forcing members to force the plug into the jack upon the shifting motion of the shutter toward the first position.

The first engaging members of the shutter, when the plug is not completely inserted into the jack, may act as means to stop the shifting motion of the shutter toward the first position to thereby detect that the plug is not completely inserted into the jack.

An important feature of the present invention is that since the interconnection between the communication line and the cord from the communication equipment is performed by inserting the plug provided on the cord into the jack communicated with the communication line, the cord is easily removed from the connecting block by drawing up the plug from the jack, if desired. Therefore, it does not take a long time to replace or relocate the communication equipment or to check the communication line.

Another feature of the present invention is that the jack is rotated so that the plug insertion opening of the jack is faced to the opening in parallel relation when the shutter is shifted to the desired open position, thereby offering the advantage that the insertion or drawing up of the plug may be easily performed.

A further feature of the present invention is that since the shutter is biased toward the first position to close the opening, the shutter can tightly close the opening whether the plug is inserted into the plug insertion opening of the jack or not, thereby offering the advantage that moisture, salty moisture, corrosive gases and the like are effectively prevented from entering the connecting block.

Still another feature of the present invention is that if the plug is incompletely inserted into the jack, the plug may be forced into the jack upon the shifting motion of the shutter toward the first position to close the opening, thereby ensuring the complete insertion of the plug.

A still further feature of the present invention is that if the plug is further incompletely inserted into the jack, the plug may restrict the shifting motion of the shutter toward the first position to close the opening, thereby offering the advantage that the user can easily know that the plug is not completely inserted into the jack. Therefore, the user may prevent erroneous operation of the communication equipment which would be caused from the incomplete insertion of the plug.

The present invention will become more fully apparent from the claims and the description as it proceeds in connection with the drawings.

BRIEF DESCRIPTION OF THE DRAWINGS

FIG. 1 is an elevational view of a closed type connecting block according to a first embodiment of the present invention;

FIG. 2 is an elevational view of the connecting block with a shutter thereof shown in its open position to open an opening;

FIG. 3 is an elevational view of the connecting block with the shutter thereof shown in its closed position to close the opening under the condition that a cord from communication equipment is inserted therein;

FIG. 4 is a partial sectional view taken along lines IV—IV of FIG. 3;

FIG. 31 is an elevational view a closed type connecting block according to an eighth embodiment of the present invention;

FIG. 32 is a side view of the connecting block:

FIG. 33 is an elevational view a closed type connecting block according lo a ninth embodiment of the present invention; and FIG. 34 is a side view of the connecting block.

DETAILED DESCRIPTION OF THE PREFERRED EMBODIMENT

Figure 5:
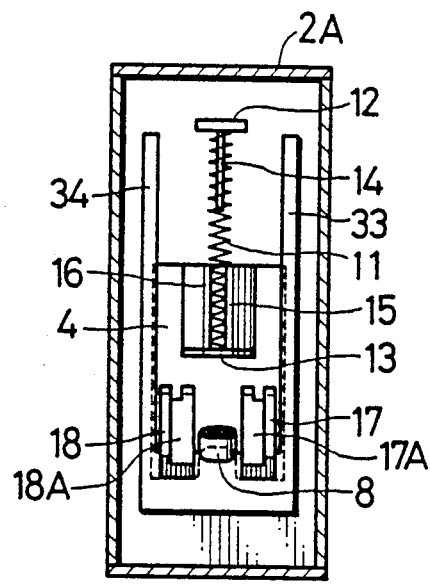
FIG. 5 is a sectional view taken along lines V—V of FIG. 4.

Referring now to FIGS. 1 to 10, shown therein is a closed type connecting block 1 according to a first embodiment of the invention which is used to electrically connect communication equipment such as a telephone, facsimile and the like to a communication line such as a telephone line. The connecting block 1 has a rectangular configuration and comprises a housing 2 having a cover plate or a front panel 2A formed with an opening 3 and a housing body 2B. The inner surface of the front panel 2A is provided with a shutter 4 which is upwardly and downwardly moved to close and open the opening 3. FIG. 1 is an elevational view of the connecting block 1 with the shutter 4 shown in a first position or a position closing the opening 3 under the condition that a cord from the communication equipment is not connected to the connecting block 1.

FIG. 2 is an elevational view of the connecting block 1 with the shutter 4 shifted to a second position or a position to fully open the opening 3. As shown in FIG. 2, a lower end portion of the shutter 4 and an upper end portion of a wire support plate 5 provided on a lower portion of the opening 3 are formed with notches 6, 7, respectively. The notches 6, 7 are contoured to the outer configuration of a wire or cord 8 connected to the communication equipment, so that the wire 8 is tightly supported in an opening formed between the notches 6, 7 when the shutter 4 is downwardly shifted (FIG. 3). The shutter 4 is formed with a projection g which may facilitate the operation of the shutter 4 and which may act as a stop for restricting the upward motion of the shutter 4.

As shown in FIGS. 4 and 5, the housing 2 is provided with a compression spring 11 as a first resilient member, its upper end abutting on a projection 12 formed on the front panel 2A of the housing 2 and its lower end abutting on a projection 13 formed on the shutter 4. The shutter 4 is normally biased to its closed position. The projection is provided with a guide rod 14 which is downwardly projected into the upper portion of the spring 11 to guide the same. The shutter 4 is provided with a pair of guide plates 15, 16 to laterally guide the lower portion of the spring 11.

Figure 6:
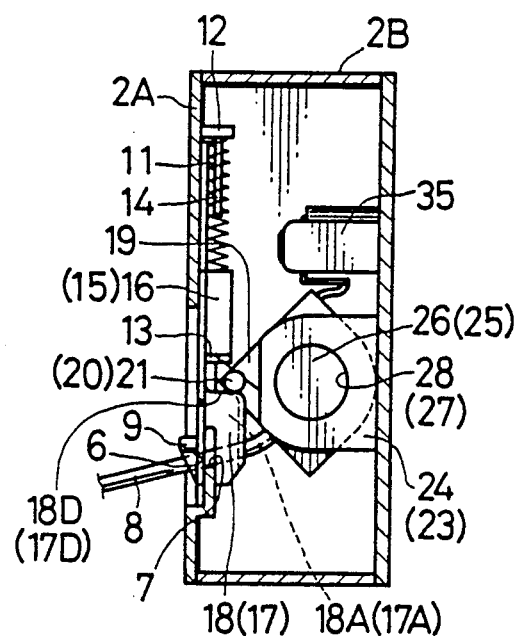
FIG. 6 is a sectional view taken along lines VI—VI of FIG. 3.
Figure 7:
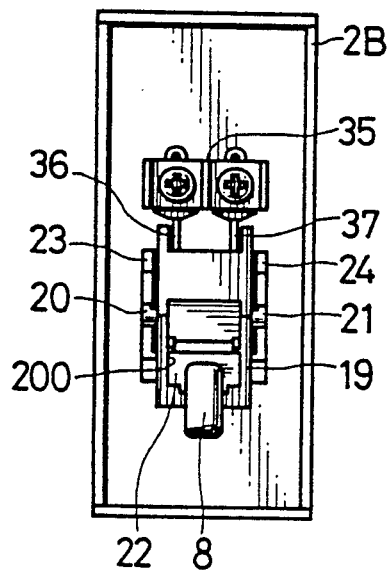
FIG. 7 is an elevational view of the connecting block with a front panel removed.

As shown in FIGS. 4 and 5, a pair of engaging strips 17, 18 are provided on the inner surface of the shutter 4. As shown in FIGS. 6 and 7, the connecting block 1 includes a jack 19 which is upwardly and downwardly pivotably positioned therein and which is adapted to receive a plug 22 connected to the end of the wire 8 (FIG. 7). The jack 19 is provided with a pair of engaging pins 20, 21 (FIG. 9) in such a way that the engaging strips 17, 18 contact the engaging pins 20, 21 upon pivotal motion of the jack 19.

Figure 9:
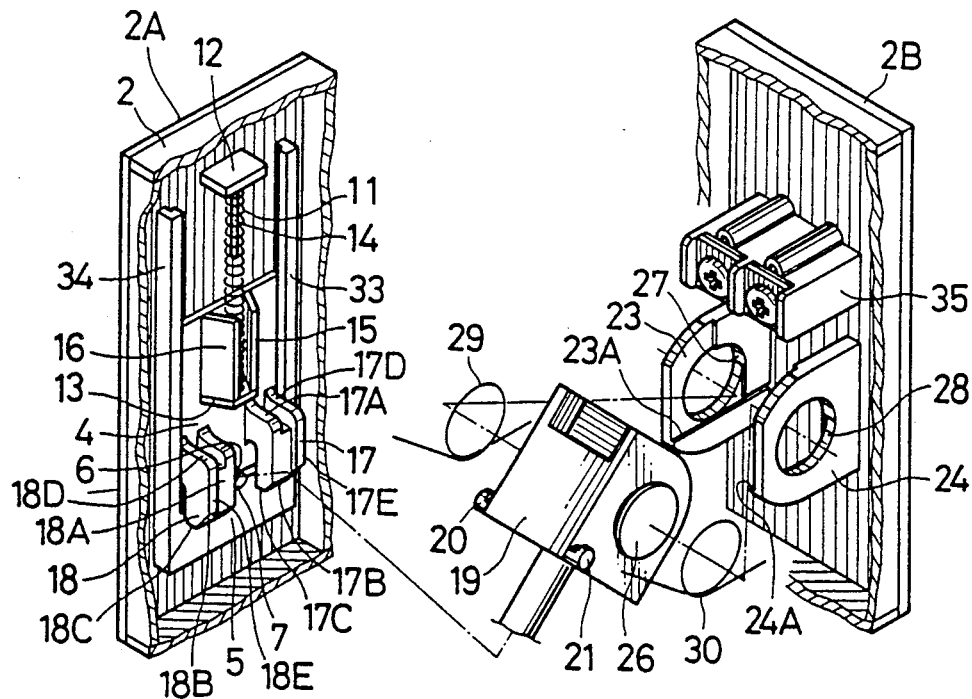
FIG. 9 is an exploded perspective view of the connecting block.

As shown in FIGS. 4, 5 and 9, the engaging strips 17, 18 include guide strips 17A, 18A formed therealong for pressing the plug 22 toward the jack 19 upon downward motion of the shutter 4. Under the condition that the plug 22 is incompletely inserted into the jack 19, as shown by broken line in FIG. 10, and when the shutter 4 is downwardly moved by the biasing force of the spring 11, the lower inclined surfaces 17B, 18B of the guide strips 17A, 18A abut on the upper edges of the plug 22, thereby forcing the plug 22 into the jack 19.

Figure 10:
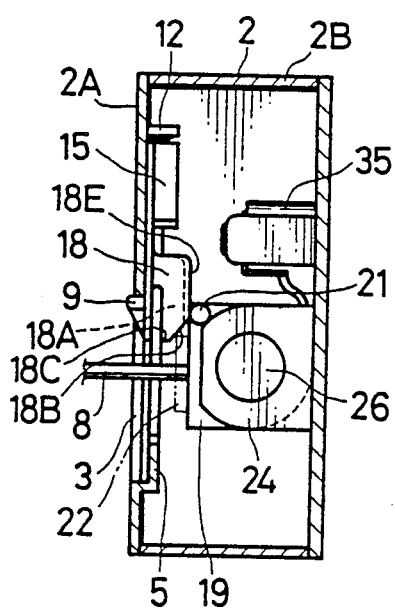
FIG. 10 is a side view similar to FIG. 6, showing the operation of the connecting block.
Figure 11:
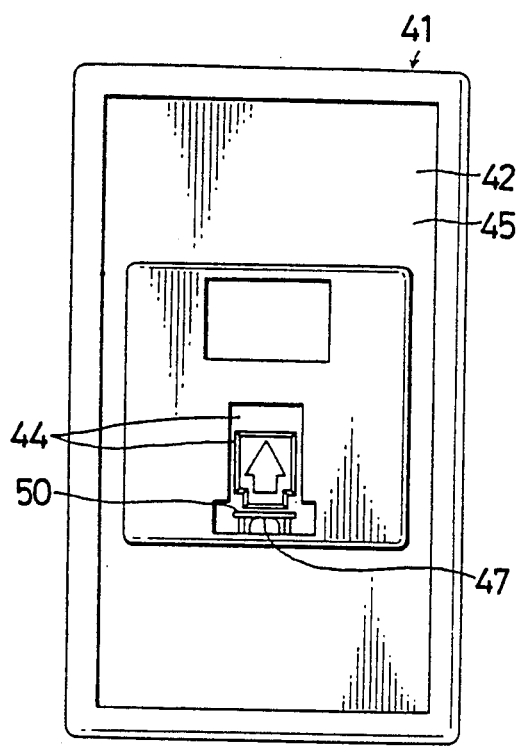
FIG. 11 is an elevational view of a closed type connecting block according to a second embodiment of the present invention.

Under the other condition that the plug 22 is further incompletely inserted into the jack 19, that is, the plug 22 is further projected from the position shown by broken line in FIG. 10, and when the shutter 4 is similarly downwardly moved, the lower flat surfaces 17C, 18C of the guide strips 17A, 18A abut on the upper surface of the plug 22, thereby preventing the downward motion of the shutter 4. Therefore, the guide strips 17A, 18A act also as a detector to detect whether the plug 22 is completely inserted into the jack 19 or not.

Figure 8:
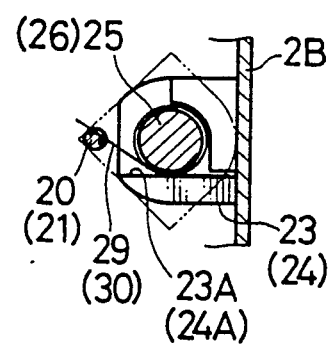
FIG. 8 is a partially sectional view of FIG. 6.

As best shown in FIG. 9, the jack 19 is pivotably supported between a pair of jack support plates 23, 24 which are secured to the inner surface of the rear wall of the housing body 2B of the housing 2. The jack 19 is provided with circular plates 25, 26 at both sides thereof which act as a pivot. The jack support plates 23, 24 are formed with circular openings 27, 28 into which the circular plates 25, 26 are rotatably received. As shown in FIGS. 8 and 9, both of the circular plates 25, 26 are provided with helical torsion springs 29, 30 as a second resilient member, their one ends abutting on the outer circumferential surface of the engaging pins 20, 21 respectively and their other ends abutting on shoulder portions 23A, 24A formed on the jack support plates 23, 24 respectively. Thus, the jack 19 is biased to cause downward pivotal motion.

As shown in FIG. 5, the inner surface of the front panel 2A of the housing 2 is provided with shutter guides 33, 34 so that the shutter 4 may be slided therebetween.

Referring to FIG. 7, the inner surface of the housing body 2B of the housing 2 is provided with a junction terminal 35 which acts as a junction between the communication line such as the telephone line and the jack 19. The junction terminal 35 is electrically connected to contacts 39 (FIG. 2) of the jack 19 through flexible lead wires 36, 37.

FIG. 9 is an exploded perspective view of the connecting block 1 which will assist in understanding the construction of the connecting block 1 more clearly.

In operation of the connecting block 1, the shutter 4 is manually upwardly moved against the biasing force of the spring 11 by utilizing the projection 9 to open the opening 3 so that the jack 19 of the connecting block 1 may receive the plug 22 which is connected to the free end of the cord 8 from the communication equipment such as telephone and facsimile. Although the engaging pins 20, 21 provided on the jack 19 are rested on the upper flat surfaces 17D, 18D of the engaging strips 17, 18 when the shutter 4 is fully closed (FIG. 6), the jack 19 is pivoted upwardly or rotated clockwise when the engaging strips 17, 18 are upwardly moved together with the shutter 4, so that such pins 20, 21 abut on the vertical surfaces 17E, 18E of the engaging strips 17, 18 (FIG. 10). It will be noted that the plug insertion opening 200 of the jack 19 faces to the opening 3 in parallel relation when the engaging pins 20, 21 abut on the vertical surfaces 17E, 18E of the engaging strips 17, 18. The plug 22 is inserted into the plug insertion opening 200 of the jack 19 after the shutter 4 is shifted to the open position (FIG. 10).

Thereafter, the upward force manually loaded on the shutter 4 is released, so that the shutter 4 is downwardly shifted under the influence of the biasing force of the spring 11 to close the opening 3. When the engaging strips 17, 18 are lowered with the shutter 4 to a predetermined position, the engaging pins 20, 21 provided on the jack 19 are disengaged from the vertical surfaces 17E, 18E of the engaging strips 17, 18 and are rested on the upper surfaces 17D, 18D thereof, as shown in FIG. 6. The engaging strips 17, 18 are further lowered after the engaging pins 20, 21 have been rested on the upper surfaces 17D, 18D of the engaging strips 17, 18, thereby causing a downward pivotal motion or counterclockwise rotation of the jack 19 with the cord 8 by the force of the spring 29, 30. As the shutter 4 is now shifted into its lowermost position, as shown FIG. 6, the cord 8 is tightly supported between the notches 6, 7. With this arrangement, since the plug insertion opening 200 of the jack 19 faces on the opening 3 when the shutter 4 is shifted to its uppermost position, the plug 22 may be easily inserted into the jack 19. Also, when the shutter 4 is moved toward the closed position, the cord 8 extending from the plug 22 is rotated counterclockwise to move away from the substantially horizontal position to the downwardly inclined position, thus preventing excessive bending of the cord 8 by the shutter 4.

The engaging strips 17, 18 are downwardly urged under the influence of the helical torsion springs 29, 30 which downwardly bias the engaging pins 20, 21. Therefore, the shutter 4 is downwardly biased under the influence of the biasing force of the spring 11 and the helical torsion springs 29, 30 so that the cord 8 may be sealingly secured in a cord entrance formed between the notches 6, 7 without forming clearances which may provide a source of entry for moisture, salty moisture, corrosive gases and the like.

Under the condition that the plug 22 is not inserted into the jack 19, the shutter 4 is shifted to its lowermost position where the cord entrance is not formed by the notches 6, 7 to completely close the opening 3 because the downward motion of the shutter 4 is not prevented by the cord (FIG. 1).

Figure 12:
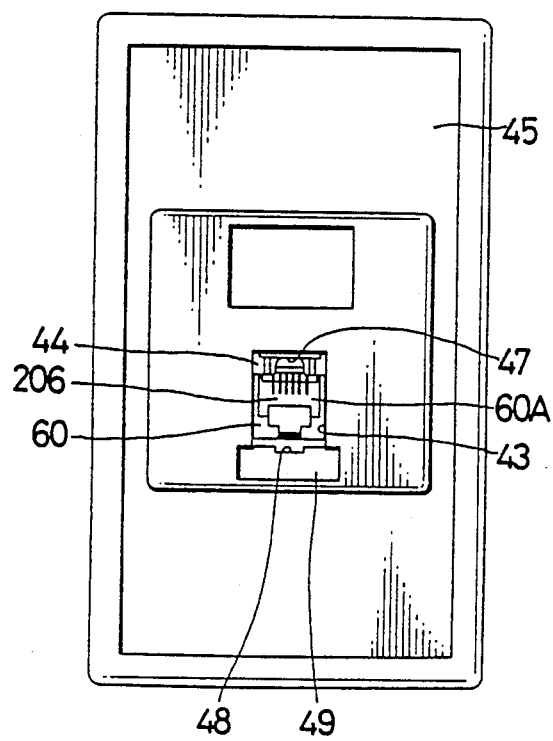
FIG. 12 is an elevational view of the connecting block with a shutter thereof shown in its open position.
Figure 13:
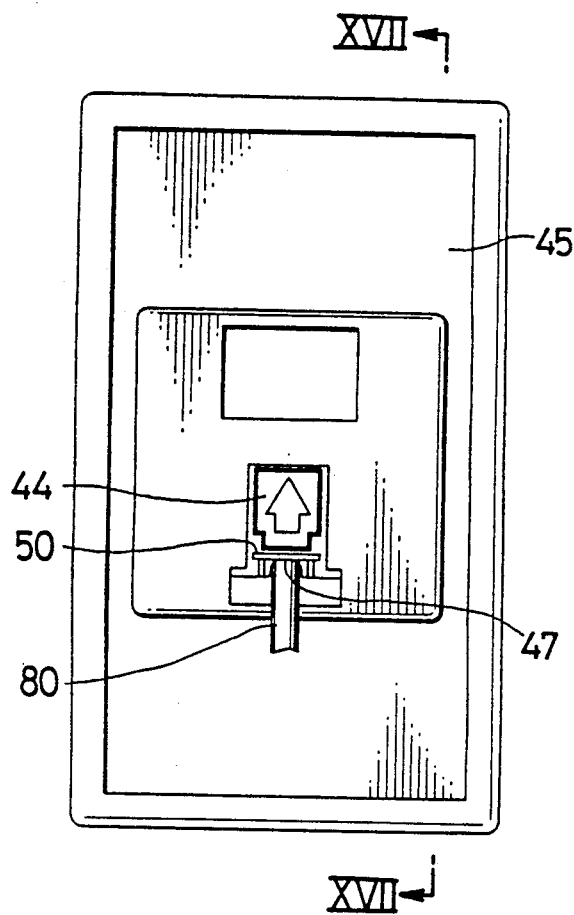
FIG. 13 is an elevational view of the connecting block with the shutter thereof shown in its closed position under the condition that a cord is inserted therein.
Figure 14:
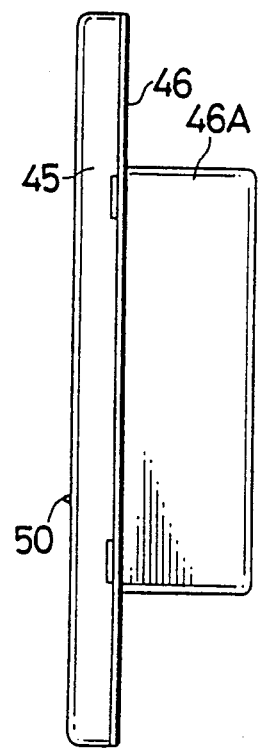
FIG. 14 is a side view of the connecting block.

Referring now to FIGS. 11 to 20, shown therein is a closed type connecting block 41 according to a second embodiment of the invention; the connecting block 41 is of flush type, which in use, is generally concealed or embedded in walls and floors and the like of buildings. As shown in FIGS. 11 to 14, the connecting block 41 comprises a generally rectangular housing 42 having a housing body 46 which includes an embedding portion 46A to be embedded in the walls and a cover plate or front panel 45 tightly engaged with the housing body 46. As shown in FIG. 12, the front panel 45 is formed with an opening 43 and is provided with a shutter 44 slidably mounted on the inner surface thereof to close and open the opening 43 and a wire support plate 49 positioned in the lower portion of the opening 43. The lower end portion of the shutter 44 and the upper end portion of the wire support plate 49 are formed with notches 47, 48, respectively. The notches 47, 48 are contoured to the outer configuration of a cord 80, so that the cord 80 is tightly supported in an opening formed between the notches 47, 48 when the shutter 44 is downwardly shifted (FIG. 13). The shutter 44 is provided with a projection 50 which facilitates the operation of the shutter 44 and which acts as a stop for restricting the upward motion of the shutter 44.

Figure 15:
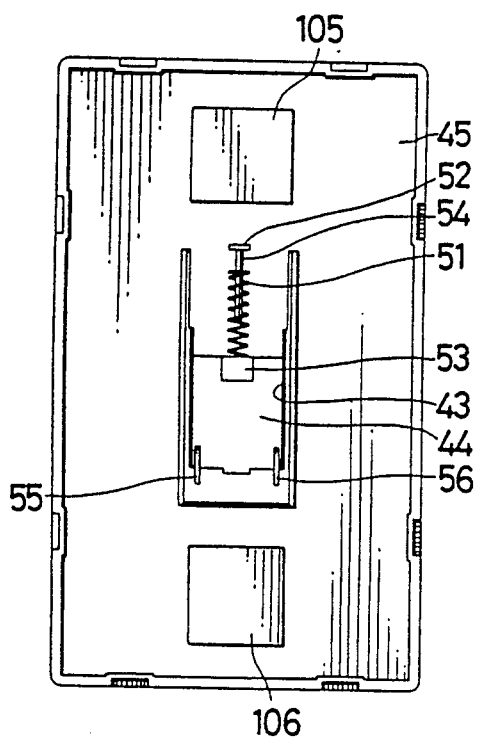
FIG. 15 is a rear elevational view of a front panel.
Figure 16:
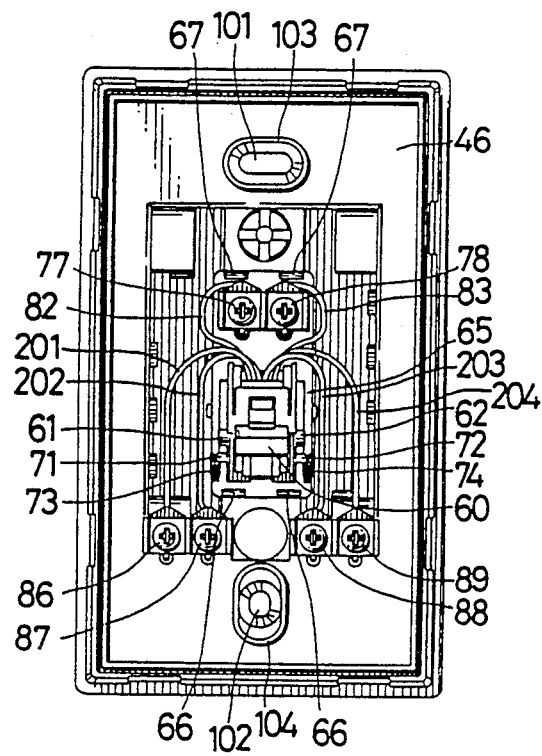
FIG. 16 is an elevational view of the connecting block with the front panel removed and a plug omitted for simplification.

As shown in FIG. 15, the front panel 45 of the housing 42 is provided with a compression spring 51 as a first resilient member, its upper end abutting on a projection 52 formed on the front panel 45 and its lower end being inserted into a cylindrical member 53 provided on the shutter 44. The shutter 44 is normally biased to its closed position. The projection 52 is provided with a guide rod 54 which is downwardly projected into the upper portion of the spring 51 for preventing disengagement of the spring 51 from the projection 52. A pair of engaging strips 55, 56 are provided on the inner surface of the shutter 44 at the lower portion thereof. As shown in FIG. 16, the connecting block 41 includes a jack 60 which is upwardly and downwardly pivotably positioned therein and is adapted to receive a plug connected to the end of the wire 80. The jack 60 is provided with a pair of engaging pins 61, 62 which may abut on the engaging strips 55, 56 upon pivotal motion of the jack 60. When the shutter 44 is upwardly shifted from the position shown in FIG. 17, the engaging strips 55, 56 are engaged with the engaging pins 61, 62 to urge the jack 60 upwardly, so that the jack 60 is pivoted upwardly or rotated clockwise toward a position in which a plug insertion opening 60A of the jack 60 faces to the opening 43 of the front panel 45 in parallel relation, as shown in FIG. 18.

Figure 18:
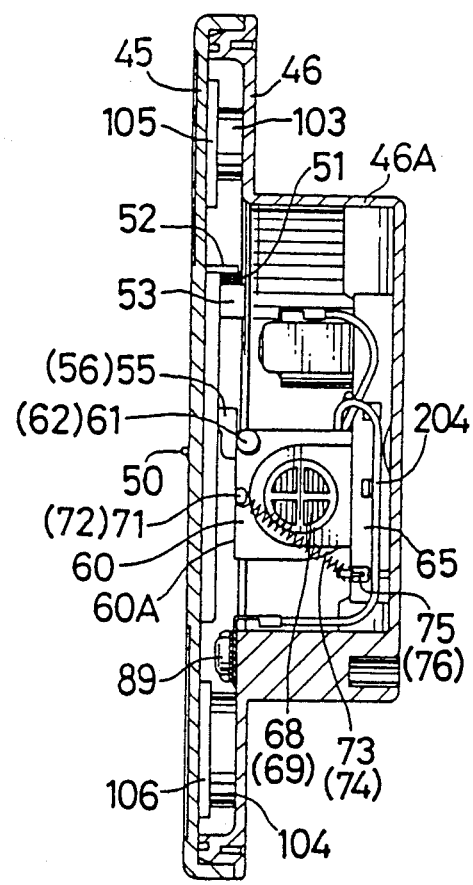
FIGS. 18 and 19 are side views similar to FIG. 17, showing the operation of the connecting block.
Figure 19:
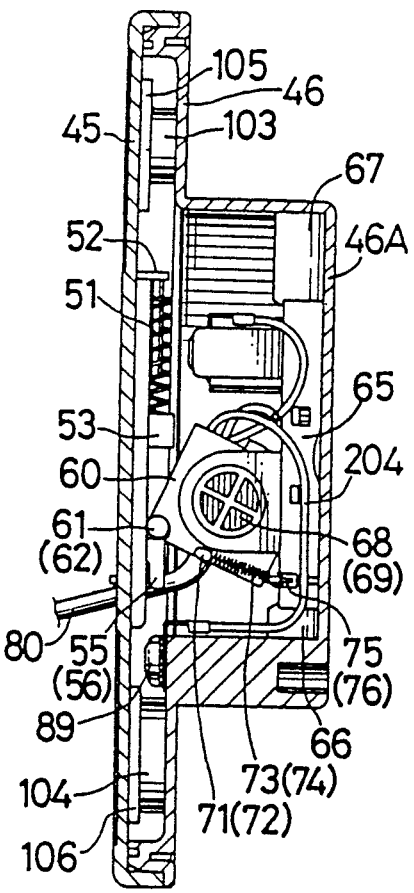
Figure 20:
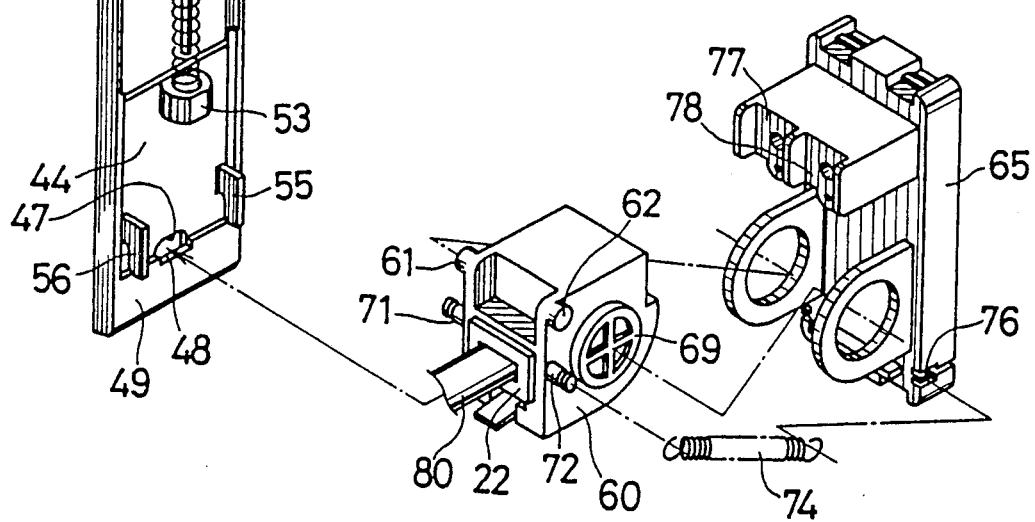
FIG. 20 is an exploded perspective view of the connecting block with the front panel and the housing body omitted for simplification.

A plug 22 connected to the cord 80 is inserted into the plug insertion opening 60A of the jack 60 after the shutter 44 is shifted to an open position or a position to open the opening 43 (FIG. 18). Thereafter, the upward force manually loaded on the shutter 44 is released, so that the shutter 44 is downwardly shifted under the influence of the biasing force of the spring 51 to close the opening 43. When the engaging strips 55, 56 are lowered with the shutter 44 to a predetermined position, the engaging pins 61, 62 provided on the jack 60 are disengaged from the vertical surface of the engaging strips 55, 56 and are rested on the upper surface thereof. The engaging strips 55, 56 are further lowered after the engaging pins 61, 62 are rested on the upper surface of the engaging strips 55, 56, thereby causing a downward pivotal motion or counterclockwise rotation of the jack 60 with the cord 80 by the biasing force of the spring 73, 74 as described hereinafter (FIG. 19). As the shutter 44 is now lowered into a desired position, the cord 80 is tightly supported between the notches 47, 48.

Figure 17:
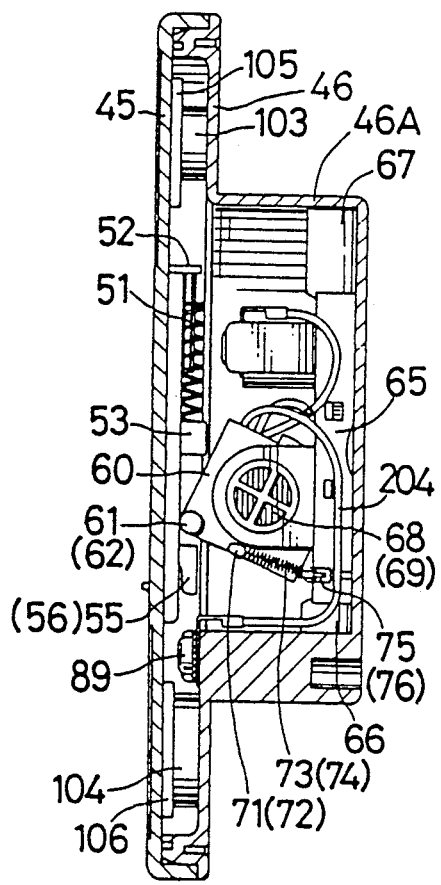
FIG. 17 is a sectional view of taken along lines XVII—XVII of FIG. 13.

As shown in FIGS. 16 to 18, the housing body 46 is provided with a plurality of pawls or clicks 66, 67 by which a jack support 65 is secured to the housing body 46. The jack support 65 is formed with circular openings into which circular plates 68, 69 provided on the jack 60 and acting as a pivot are rotatably received so that the jack 60 is upwardly and downwardly pivotably supported. The jack 60 and the jack support 65 are provided with spring support pins 71, 72 and spring support strips 75, 76, respectively. The jack 60 and jack support 65 are provided with tension springs 73, 74 as a second resilient member, their one ends being engaged with the spring support pins 71, 72 and their other ends being engaged with the spring support strips 75, 76, so that the jack 60 is biased in a direction to cause a downward pivotal motion or counterclockwise rotation thereof. The jack support 65 is provided with junction terminals 77, 78 which are connected to the communication line (not shown) such as the telephone line and to leads 82, 83 connected to a contact 206 disposed in the insertion opening 60A of the jack 60. The housing body 46 is provided with junction terminals 86, 87, 88, 89 which are connected to leads 201, 202, 203, 204 connected to the contact 206.

As shown in FIG. 16, the housing body 46 of the connecting block 41 are formed with apertures 101, 102 through which screws are inserted for securing the connecting block 41 to the wall. The housing body 46 are formed with annular projections 103, 104 enclosing the apertures 101, 102. The inner surface of the front panel 45 is provided with rectangular packing seals 105, 106 adapted to contact the annular end surfaces of the projections 103, 104, as shown in FIG. 15. As will be appreciated, with the front panel 45 is fitted to the housing body 46, the packing seals 105, 106 sealingly contact the annular end surfaces of the projections 103, 104 to prevent entery of moisture. corrosive gases and the like through the apertures 101, 102 (FIGS. 17 and 18).

Some embodiments modified from the second embodiment will now be described with reference to the FIGS. 21 to 34, wherein only parts different from those shown in FIGS. 11 to 20 will be explained.

Figure 21:
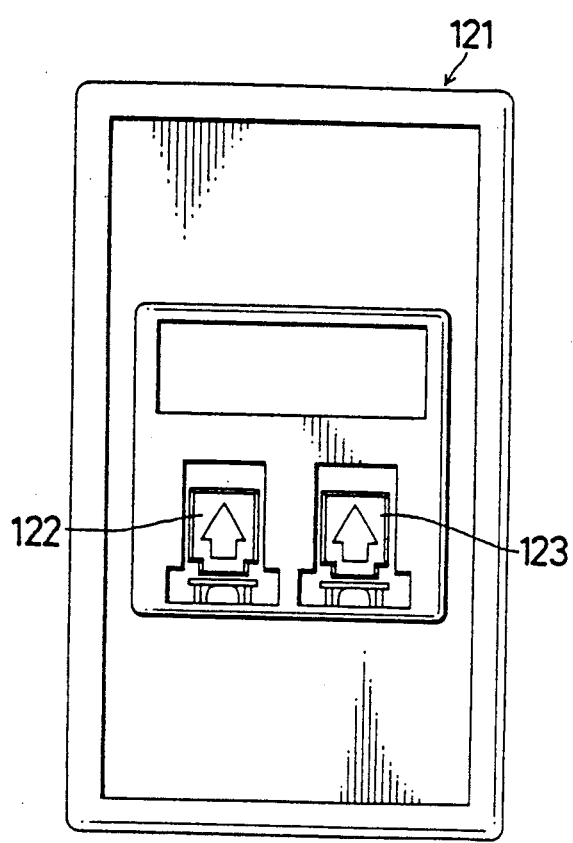
FIG. 21 is an elevational view a closed type connecting block according to a third embodiment of the present invention.
Figure 22:
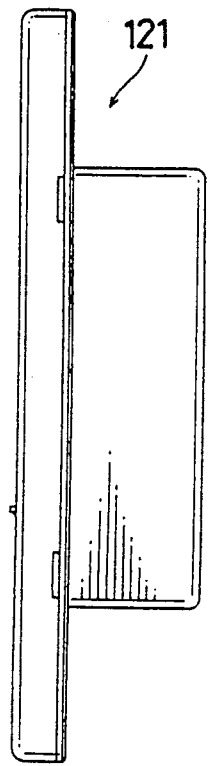
FIG. 22 is a side view of the connecting block.

FIGS. 21 and 22 show a closed type connecting block 121 according to a third embodiment of the invention. The connecting block 121 includes a pair of shutters 122, 123 as well as a pair of jacks (not shown).

Figure 23:
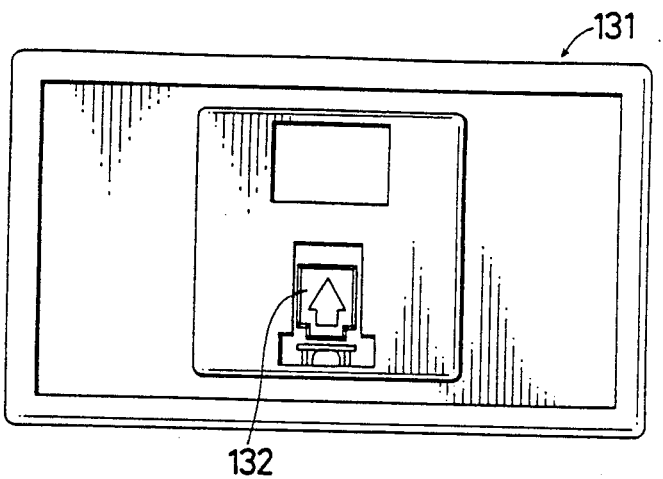
FIG. 23 is an elevational view a closed type connecting block according to a fourth embodiment of the present invention.
Figure 24:
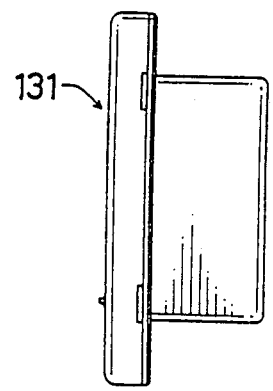
FIG. 24 is a side view of the connecting block.

FIGS. 23 and 24 show a closed type connecting block 131 according to a fourth embodiment of the invention. The connecting block 131 has an oblong configuration, that is, the horizontal length is longer than the vertical length. The connecting block 131 includes a shutter 132 and a jack (not shown).

Figure 25:
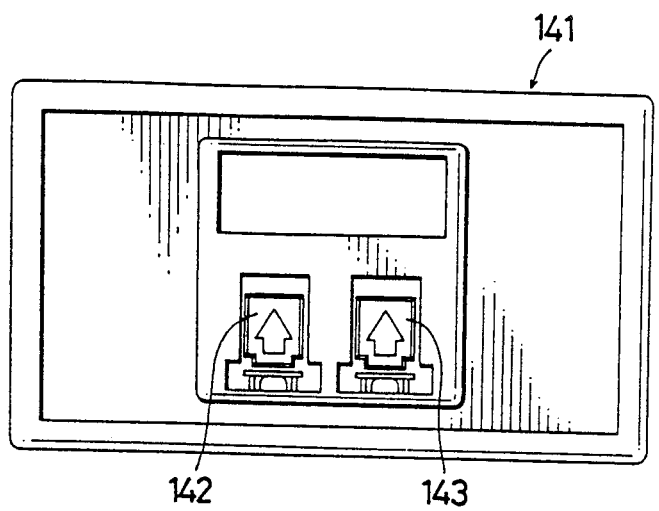
FIG. 25 is an elevational view a closed type connecting block according to a fifth embodiment of the present invention.
Figure 26:
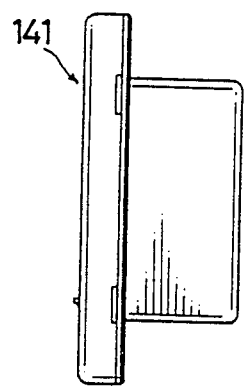
FIG. 26 is a side view of the connecting block.

FIGS. 25 and 26 show a closed type connecting block 141 according to a fifth embodiment of the invention. The connecting block 141 has a rectangular configuration similar to that of the connecting block 131 of the fourth embodiment but has a pair of shutters 142, 143 and a pair of jacks (not shown).

Figure 27:
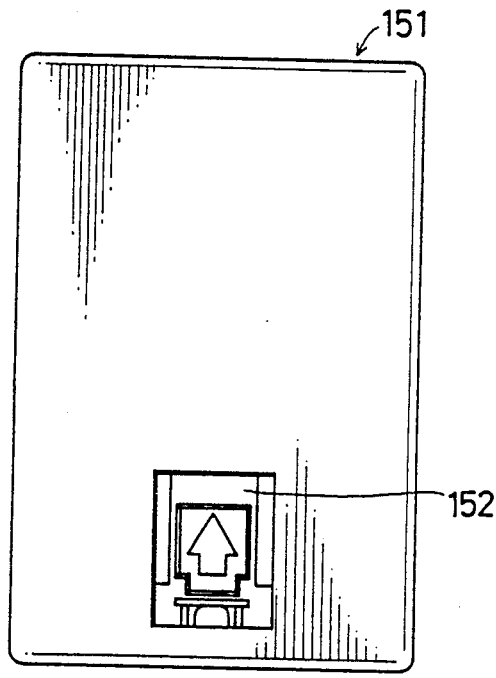
FIG. 27 is an elevational view a closed type connecting block according to a sixth embodiment of the present invention.
Figure 28:
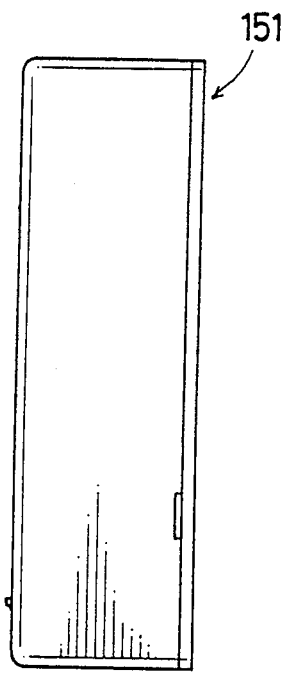
FIG. 28 is a side view of the connecting block.

FIGS. 27 and 28 show a closed type connecting block 151 according to a sixth embodiment of the invention. The connecting block 151 is generally mounted on the surface of walls and has a shutter 152 and a Jack not shown). The connecting block 151 has not a embeddable portion as designated by numeral 46A in FIG. 14.

Figure 29:
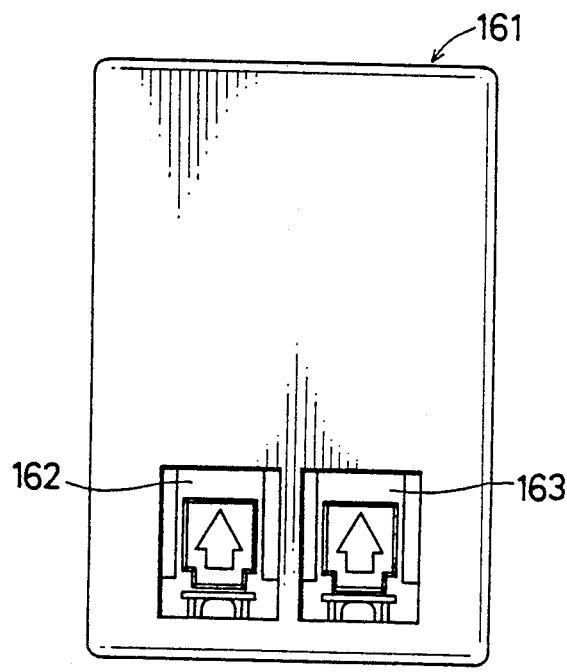
FIG. 29 is an elevational view a closed type connecting block according to a seventh embodiment of the present invention.
Figure 30:
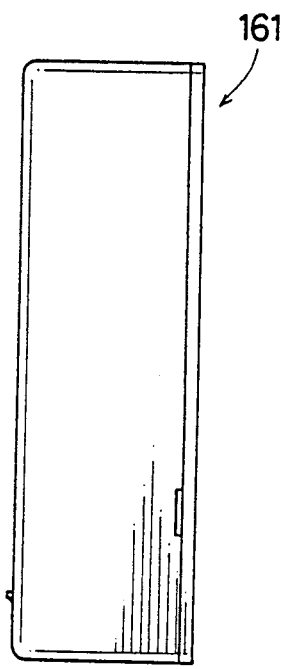
FIG. 30 is a side view of the connecting block.

FIGS. 29 and 30 show a closed type connecting block 161 according to a seventh embodiment of the invention. The connecting block 161 is similar to that of the sixth embodiment but has a pair of shutters 62, 163 and a pair of jacks (not shown).

FIGS. 31 and 32 show a closed type connecting block 171 according to an eighth embodiment of the invention. The connecting block 171 is similar to that of the sixth embodiment but has a rectangular configuration in which the horizontal length is longer than the vertical length. The connecting block 171 includes a shutter 172 and a jack (not shown).

FIGS. 33 and 34 show a closed type connecting block 181 according to a ninth embodiment of the invention. The connecting block 181 has a configuration similar to that of the connecting block of the eighth embodiment but has a pair of shutters 182, 183 and a pair of jacks (not shown).

The preferred embodiments herein described are intended to be illustrative of the inventions and not to limit the inventions to the precise form herein described. They are chosen and described to explain the principles of the invention and their application and practical use to enable others skilled in the art to practice the invention.

What is claimed is:

1. A connecting block for electrically connecting communication equipment to communication line, of the closed type which prevents entry of moisture, salty moisture, corrosive gases and the like when said connecting block is either in use or not in use, comprising:

a housing including a housing body and a covering member sealingly engageable with said housing body, said covering member having an opening of a size to permit insertion of a plug connected to a cord from the communication equipment;

a shutter for closing and opening said opening:

a jack electrically connected to the communication line and having a plug insertion opening;

said shutter and said covering member each having a notch contoured to the outer configuration of the cord so that the cord is tightly secured between said notches when said shutter is shifted to a first position to close said opening under the condition that said plug is inserted into said plug insertion opening of said jack;

a first resilient member biasing said shutter toward the first position to close said opening;

jack support members pivotably supporting said jack;

second resilient members biasing said jack toward the first position;

first engaging members mounted on said shutter; and second engaging members mounted on said jack and adapted to engage said first engaging member, wherein said first engaging members are engaged with said second engaging members to pivot said jacks against the biasing force of said second resilient members so that said plug insertion opening is faced to said opening of said covering member in parallel relation when said shutter is shifted toward a second position to open said opening against the biasing force of said first resilient member, and wherein said jack is pivoted with the aid of the biasing force of said second resilient members so that said plug insertion opening of said jack is inclined toward the first position when said shutter is shifted toward the first position with the aid of the biasing force of said first resilient member.

2. The connecting block as defined in claim 1, wherein said first resilient member is a compression spring.

3. The connecting block as defined in claim 2, wherein said second resilient member is a helical coil spring.

4. The connecting block as defined in claim 3, which has a lengthwise configuration.

5. The connecting block as defined in claim 4, wherein the number of said shutters and jacks is one respectively.

6. The connecting block as defined in claim 2, wherein said second resilient member is a tension spring.

7. The connecting block as defined in claim 6, wherein said housing body having an embeddable portion to be embedded in a wall and the like.

8. The connecting block as defined in claim 7, which has a lengthwise configuration.

9. The connecting block as defined in claim 8, wherein the number of said shutters and jacks is one respectively.

10. The connecting block as defined in claim 8, wherein the number of said shutters and jacks is two respectively.

11. The connecting block as defined in claim 7, which has an oblong configuration.

12. The connecting block as defined in claim 11, wherein the number of said shutters and jacks is one respectively.

13. The connecting block as defined in claim 11, wherein the number of said shutters and jacks is two respectively.

14. The connecting block as defined in claim 1, wherein said first engaging members, when said plugs are not completely inserted into said jacks, may act as forcing members to force said plugs into said jacks upon the shifting motion of said shutters toward the first position.

15. The connecting block as defined in claim 1, wherein said first engaging members, when said plugs are not completely inserted into said jacks, may act as means to stop the shifting motion of said shutters toward the first position to thereby detect that said plugs are not completely inserted into said jacks.

* * * * *